US008234952B2

(12) United States Patent
Ting

(10) Patent No.: US 8,234,952 B2
(45) Date of Patent: Aug. 7, 2012

(54) HANDGRIP FOR HANDLEBAR

(76) Inventor: Chen Li Ting, Tainan (TW)

( * ) Notice: Subject to any disclaimer, the term of this patent is extended or adjusted under 35 U.S.C. 154(b) by 601 days.

(21) Appl. No.: 12/500,750

(22) Filed: Jul. 10, 2009

(65) Prior Publication Data

US 2010/0263477 A1  Oct. 21, 2010

(51) Int. Cl.
*B62K 21/26* (2006.01)
(52) U.S. Cl. .................................... 74/551.9; 74/551.8
(58) Field of Classification Search ............. 74/551.9, 74/551.8; 16/421; *B62K 21/26*
See application file for complete search history.

(56) References Cited

U.S. PATENT DOCUMENTS

| | | | | |
|---|---|---|---|---|
| 5,461,936 A | * | 10/1995 | Bulkeley | 74/489 |
| 2004/0068844 A1 | * | 4/2004 | Lumpkin | 16/421 |
| 2007/0157758 A1 | * | 7/2007 | Shih | 74/551.9 |
| 2008/0156139 A1 | * | 7/2008 | Lai | 74/551.9 |
| 2008/0196540 A1 | * | 8/2008 | Wu | 74/551.9 |

FOREIGN PATENT DOCUMENTS

JP  10-203463  *  8/1998

OTHER PUBLICATIONS

English Abstract of JP 10-203463.*

\* cited by examiner

*Primary Examiner* — Vinh Luong
(74) *Attorney, Agent, or Firm* — Yudell Isidore Ng Russell PLLC

(57) ABSTRACT

A handgrip includes a tubular grip body adapted to be sleeved on a handlebar and having at least two angularly spaced-apart resilient clamp portions, a sleeve ring sleeved around the clamp portions and having an arc-shaped hole extending through inner and outer faces thereof and extending circumferentially proximate to one of the clamp portions, and two slots communicating respectively with two opposite ends of the arc-shaped hole, a U-shaped bolt member having a bight portion received movably in the arc-shaped hole and abutting against said one of the clamp portions, and two threaded arms extending respectively and outwardly of the slots, and two nut members each disposed outwardly of a respective slot and engaging threadedly a respective threaded arm. The nut members pull the threaded arms when tightened so that the bight portion pushes said one of the clamp portions toward the other one of the clamp portions.

8 Claims, 4 Drawing Sheets

HANDGRIP FOR HANDLEBAR

CROSS-REFERENCE TO RELATED APPLICATION

This application claims priority of Taiwanese Application Nos. 098206530 and 098209234 filed respectively on Apr. 20, 2009 and May 26, 2009.

BACKGROUND OF THE INVENTION

1. Field of the Invention

This invention relates to a handgrip for a handlebar.

2. Description of the Related Art

A conventional handgrip generally assembled on a handlebar of a vehicle or a movable instrument is soft, and has an anti-slip function. The conventional handgrip is configured simply as a hollow sleeve body sleeved fittingly on the handlebar. Since a fixing unit is not provided between the conventional handgrip and the handlebar, the handgrip and the handlebar are likely to rotate relative to each other. After a period of use, the handgrip will become loose and unstable. To resolve the aforementioned drawback, different kinds of fastening units have been developed to position the handgrip on the handlebar.

SUMMARY OF THE INVENTION

Therefore, the object of the present invention is to provide a handgrip for a handlebar that has a novel structure and that can be secured stably to the handlebar.

According to this invention, a handgrip for a handlebar comprises a tubular grip body and a fastening unit. The tubular grip body is adapted to be sleeved on the handlebar, and has an annular end, and at least two angularly spaced-apart resilient clamp portions projecting outwardly and axially from said annular end. The fastening unit is disposed on the annular end, and includes a sleeve ring, a U-shaped bolt member, and two nut members. The sleeve ring is sleeved around the resilient clamp portions, and has an inner face facing the resilient clamp portions, an outer face opposite to the inner face, a substantially arc-shaped hole extending through the inner and outer faces and extending circumferentially proximate to one of the resilient clamp portions, and two slots communicating spatially and respectively with two circumferentially opposite ends of the arc-shaped hole. The U-shaped bolt member has a bight portion received movably in the arc-shaped hole and abutting against said one of the resilient clamp portions, and two threaded arms connected respectively to two opposite ends of the bight portion and extending respectively and outwardly of the slots. Each nut member is disposed outwardly of one of the slots, and engages threadedly one of the threaded arms. The nut members pull the threaded arms when tightened so that the bight portion pushes said one of the resilient clamp portions toward the other one of the resilient clamp portions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

A handgrip according to the preferred embodiment of the present invention is adapted to be installed on a handlebar of a vehicle or a movable instrument. In this embodiment, a handlebar 1 of a bicycle is exemplified.

Referring to FIGS. 1 to 4, the handgrip of the present invention is shown to comprise a tubular grip body 2, a first fastening unit 3, and a second fastening unit 4.

Figure 1:
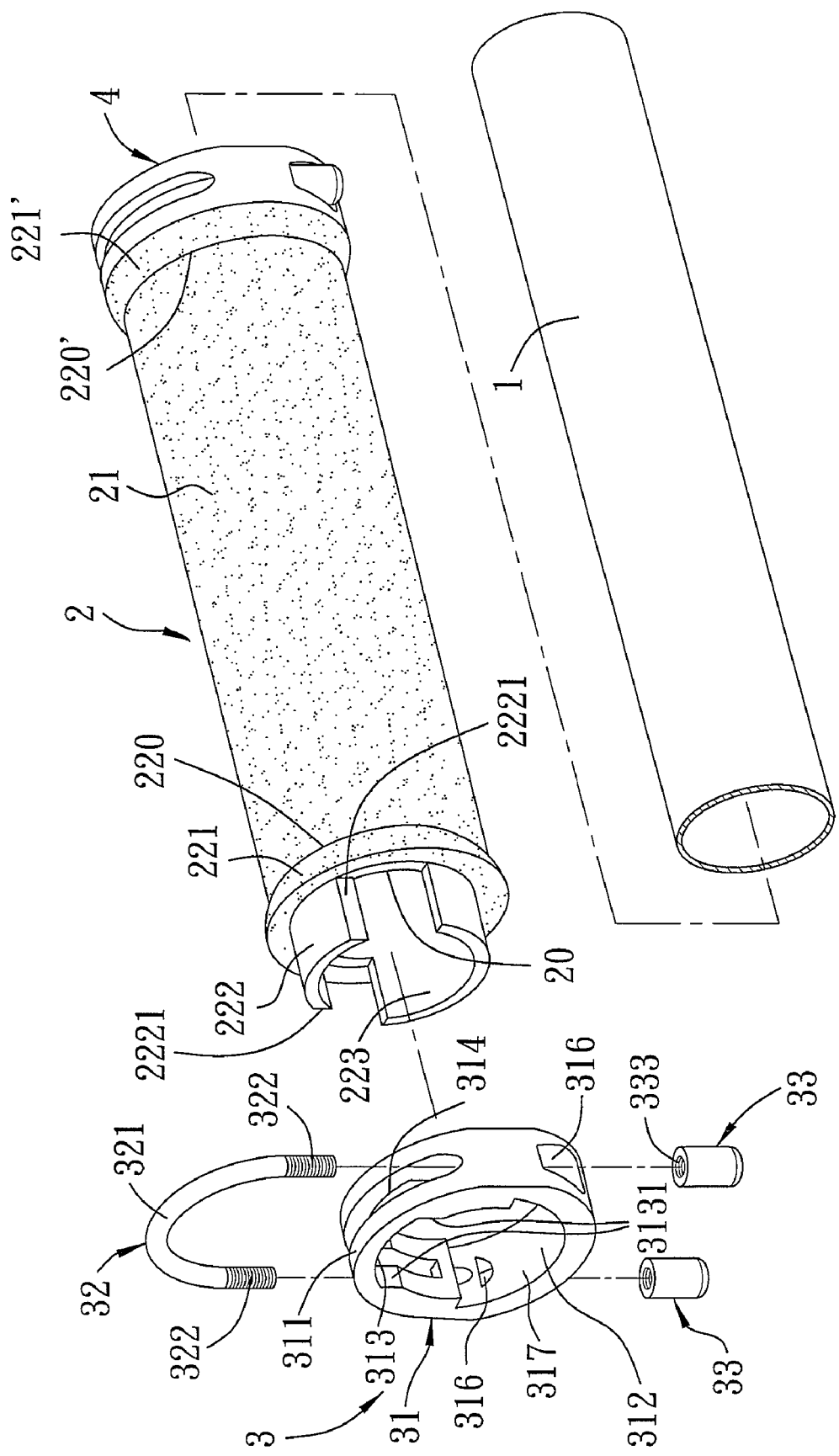
FIG. 1 is an exploded perspective view of a handgrip according to the preferred embodiment of the present invention.
Figure 2:
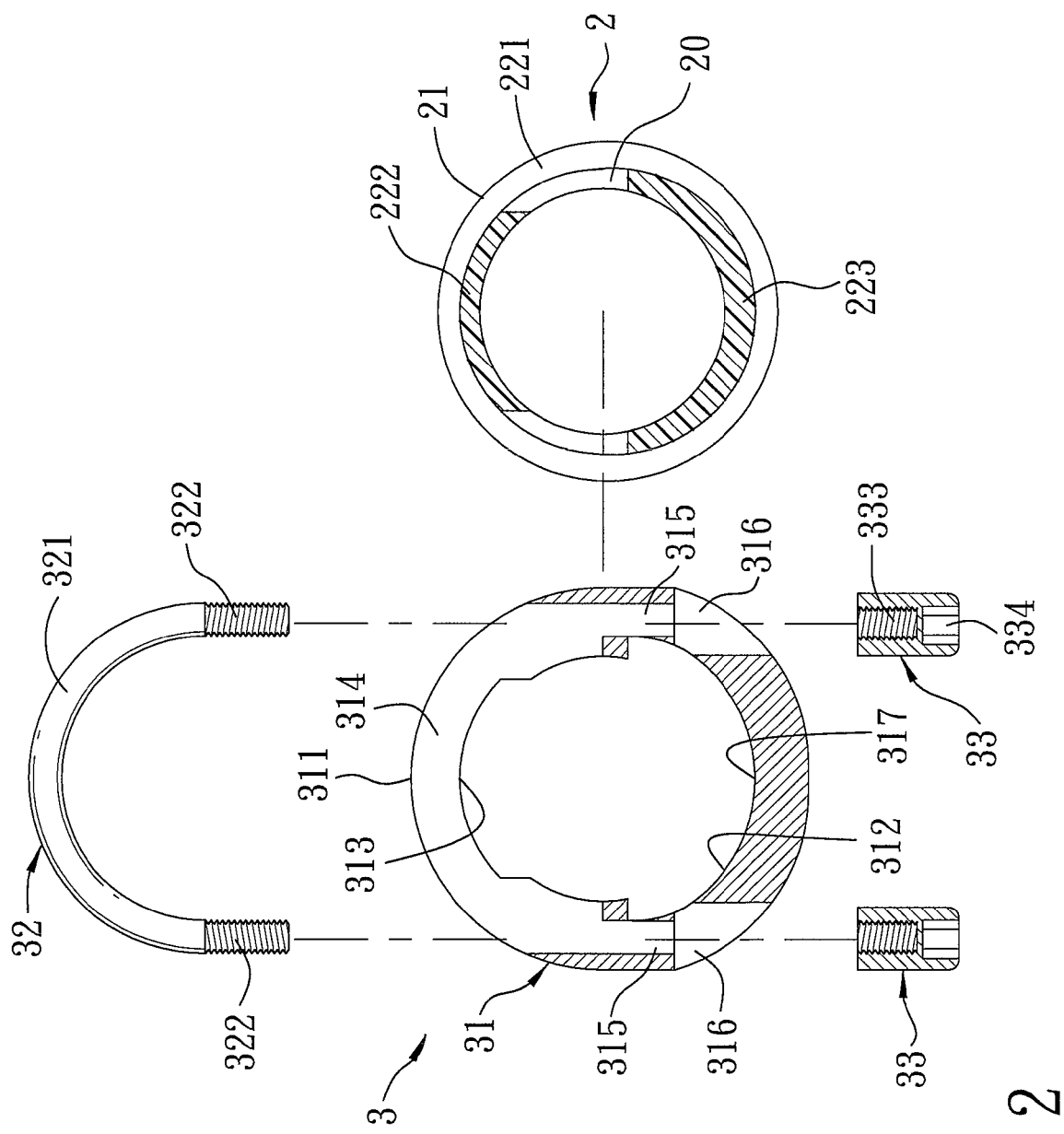
FIG. 2 is an exploded cross-sectional view of the preferred embodiment.
Figure 3:
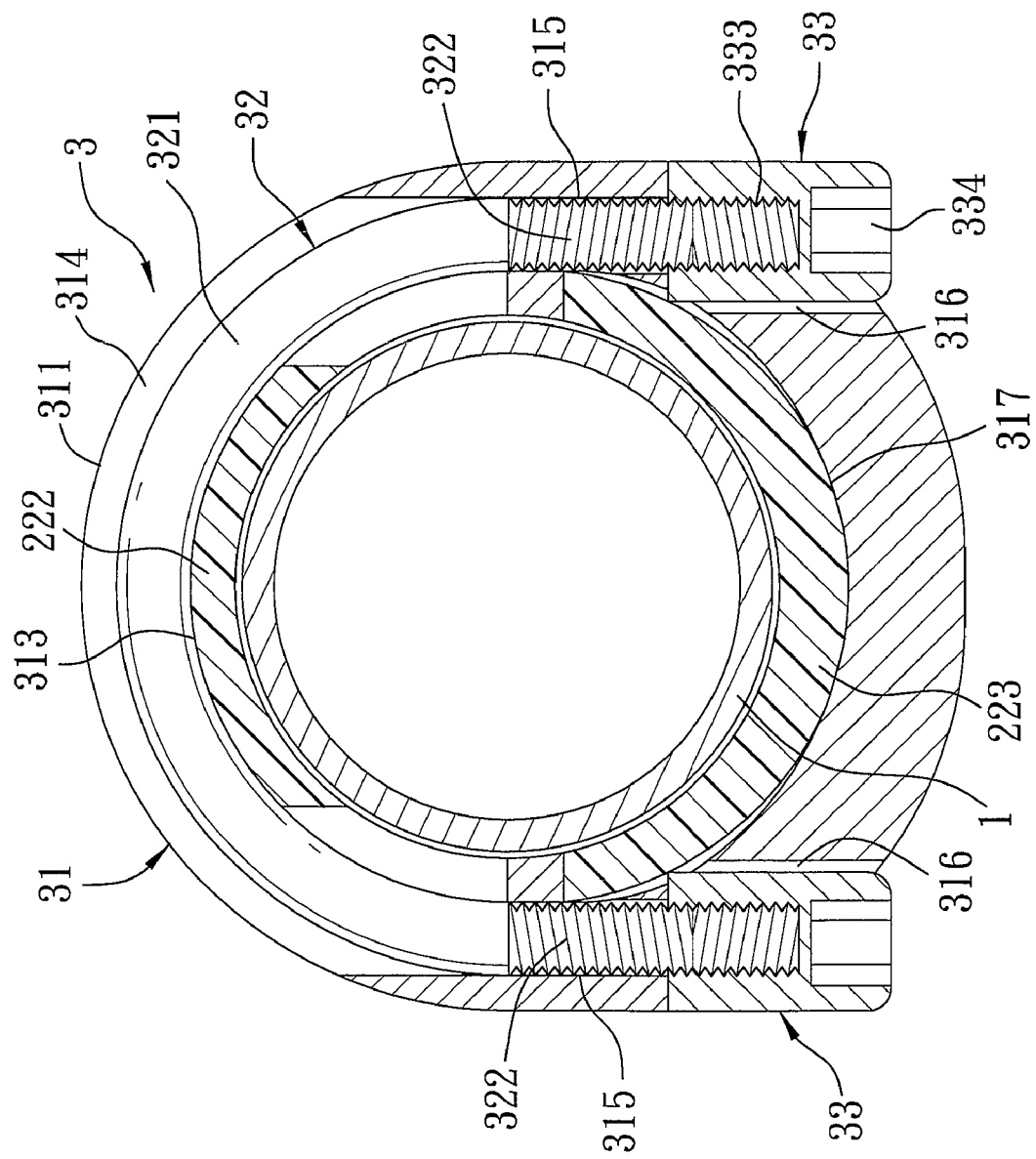
FIG. 3 is a cross-sectional view of the preferred embodiment in an assembled state.

The tubular grip body 2 is adapted to be sleeved on the handlebar 1, and includes an outer tube 21 having opposite annular first and second ends 220, 220', and an inner tube 20 inserted fittingly into the outer tube 21 and having at least two angularly spaced-apart resilient clamp portions 222, 223 projecting outwardly and axially from a corresponding one of the first and second ends 220, 220' (only the clamp portions 222, 223 that project outwardly, oppositely, and axially from the first end 220 is visible in FIG. 1). Each of the first and second ends 220, 220' has an annular flange 221, 221' projecting outwardly and radially therefrom. In this embodiment, two resilient clamp portions 222, 223 project outwardly, oppositely, and axially from a corresponding one of the first and second ends 220, 220' of the outer tube 21. In an alternative embodiment, the number of the resilient clamp portions 222, 223 may be increased as required. Further, in this embodiment, the inner and outer tubes 20, 21 are assembled together. In an alternative embodiment, the inner and outer tubes 20, 21 are molded integrally, and the outer tube 21 has a material softer than that of the inner tube 20.

The first fastening unit 3 is disposed on the first end 220 of the tubular grip body 2, and includes a sleeve ring 31, a U-shaped bolt member 32, and two nut members 33. The sleeve ring 31 is sleeved around the resilient clamp portions 222, 223, and has an inner face 312 facing the resilient clamp portions 222, 223, an outer face 311 opposite to the inner face 312, a substantially arc-shaped hole 314 extending through the inner and outer faces 312, 311 and extending circumferentially proximate to the clamp portion 222, two parallel slots 315 (see FIG. 2) communicating spatially and respectively with two circumferentially opposite ends of the arc-shaped hole 314, and two circumferentially spaced-apart recesses 316 formed in the outer face 311 and communicating spatially and respectively with the slots 315. The sleeve ring 31 further has first and second retaining grooves 313, 317. The first retaining groove 313 is formed in the inner face 312, communicates spatially with the arc-shaped hole 314, receives the clamp portion 222, and has two circumferentially spaced-apart groove walls 3131. The clamp portion 222 has two circumferentially opposite ends 2221 abutting respectively against the groove walls 3131. The second retaining groove 317 is formed in the inner face 312 opposite to the first retaining groove 313, and receives the clamp portion 223. The shape and number of the first and second retaining grooves 313, 317 depend on the shape and number of the resilient clamp portions 222, 223 since the first and second retaining grooves 313, 317 receive respectively the clamp portions 222, 223.

The U-shaped bolt member 32 has a bight portion 321 received movably in the arc-shaped hole 314 and abutting against the clamp portion 222, and two threaded arms 322 connected respectively to two opposite ends of the bight portion 321 and extending respectively and outwardly of the slots 315.

The nut members 33 position the U-shaped bolt member 32 on the sleeve ring 31, and are disposed respectively in the recesses 316 outwardly of the slots 315. Each nut member 33 has one end provided with an internally threaded hole 333 engaged to a respective threaded arm 322 of the U-shaped bolt member 32, and the other opposite end provided with a tool-receiving groove 334 (see FIG. 2).

The second fastening unit 4 is disposed on the annular second end 220' of the tubular grip body 2, and has a structure similar to that of the first fastening unit 3. Hence, a detailed description of the same is dispensed herewith for the sake of brevity. Further, since the connection between the second fastening unit 4 and the second end 220' of the tubular grip body 2 is similar to that of the first fastening unit 3 and the first end 220 of the tubular grip body 2, a detailed description of the same is dispensed herewith.

In preparation for assembly of the handgrip of the present invention on the handlebar 1, the clamp portions 222, 223 are extended into the respective first and second retaining grooves 313, 317 so as to prevent rotation of the sleeve ring 31 relative to the tubular grip body 2, and the bight portion 321 of the U-shaped bolt member 32 is abutted, but not pressed, against the clamp portion 222.

Figure 4:
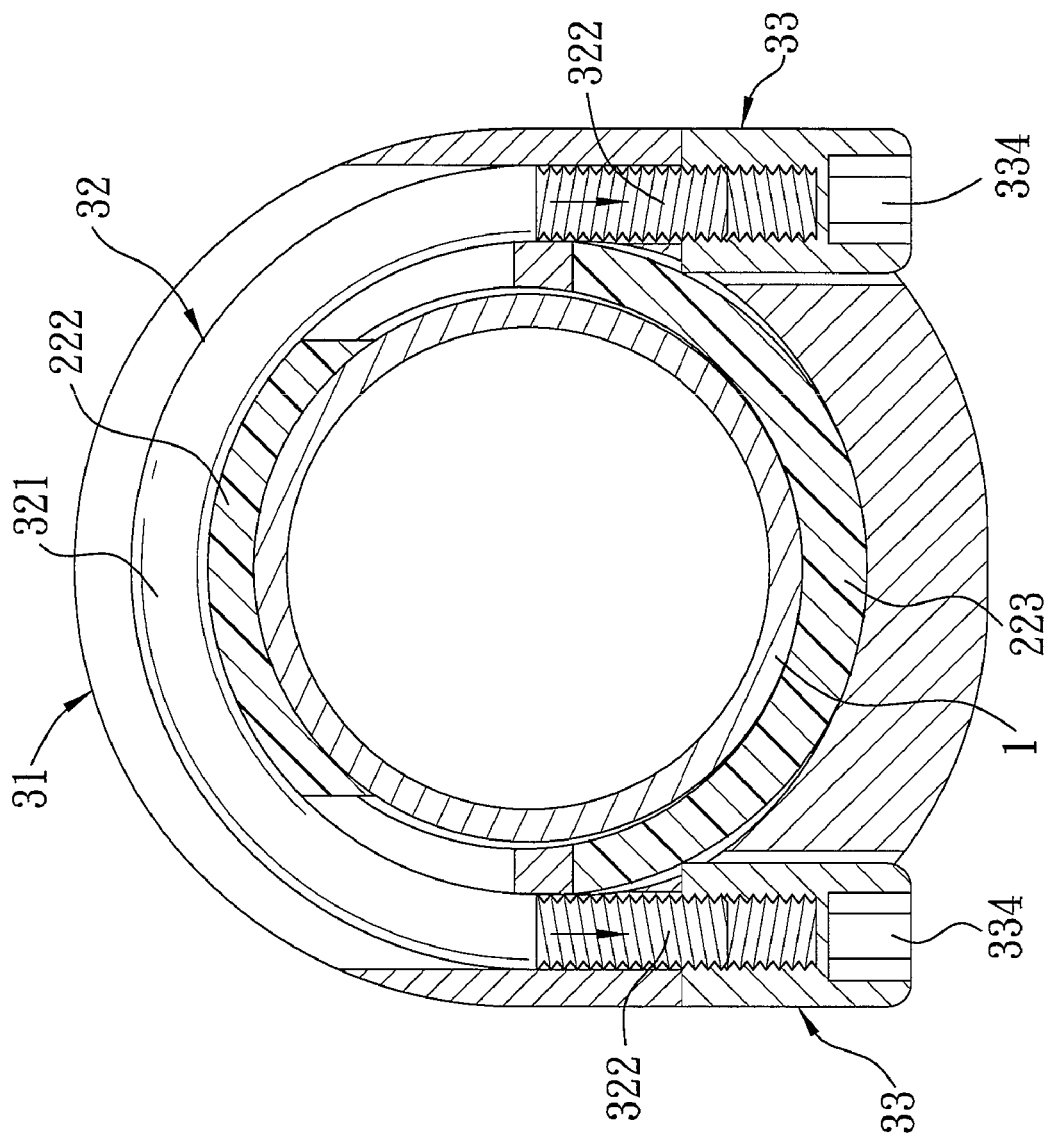
FIG. 4 is a view similar to FIG. 3, but illustrating threaded arms of a U-shaped bolt member being pulled downwardly by nut members when tightened.

For actual assembly of the handgrip of the present invention, the handgrip is first sleeved on the handlebar 1. Since there is an annular gap between the clamp portions 222, 223 and the handlebar 1, the handlebar 1 can extend easily into the tubular grip body 2. With reference to FIG. 4, to complete assembly of the handgrip of the present invention on the handlebar 1, a wrench (not shown) may be used to rotate each nut member 33 within the respective recess 316 by inserting the wrench into the tool-receiving groove 334 in each nut member 33. As the nut members 33 are rotated, the threaded arms 322 of the U-shaped bolt member 32 are pulled downwardly, as shown by the arrows, which in turn also pull downwardly the bight portion 321, so that the bight portion 321 pushes the clamp portion 222 toward the clamp portion 223, thereby clamping therebetween the handlebar 1 and preventing movement of the handgrip of the present invention relative to the handlebar 1.

Alternatively, the tubular grip body 2 may be sleeved first on the handlebar 1, after which the first fastening unit 3 is installed on the first end 220 of the tubular grip body 2.

From the aforementioned description, it is apparent that by installing the first fastening unit 3 to the first end 220 of the tubular grip body 2 and the second fastening unit 4 to the second end 220' of the tubular grip body 2, after which the nut members 33 are tightened so as to pull downwardly the threaded arms 322 and the bight portion 321 of the U-shaped bolt members 32 of the first and second fastening units 3, 4, thereby resulting in the clamp portions 222, 223 clamping therebetween the handlebar 1. Hence, the handgrip of the present invention is secured stably to the handlebar 1.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A handgrip for a handlebar, comprising:
    a tubular grip body adapted to be sleeved on the handlebar, and having an annular first end, and at least two angularly spaced-apart resilient clamp portions projecting outwardly and axially from said annular first end; and
    a first fastening unit disposed on said annular first end, and including a sleeve ring, a U-shaped bolt member, and two nut members, said sleeve ring being sleeved around said resilient clamp portions and having an inner face facing said resilient clamp portions, an outer face opposite to said inner face, a substantially arc-shaped hole extending through said inner and outer faces and extending circumferentially proximate to one of said resilient clamp portions, and two slots communicating spatially and respectively with two circumferentially opposite ends of said arc-shaped hole, said U-shaped bolt member having a bight portion received movably in said arc-shaped hole and abutting against said one of said resilient clamp portions, and two threaded arms connected respectively to two opposite ends of said bight portion and extending respectively and outwardly of said slots, each of said nut members being disposed outwardly of one of said slots and engaging threadedly one of said threaded arms;
    wherein said nut members pull said threaded arms when tightened so that said bight portion pushes said one of said resilient clamp portions toward the other one of said resilient clamp portions.

2. The handgrip of claim 1, wherein said sleeve ring further has a first retaining groove formed in said inner face thereof, communicating spatially with said arc-shaped hole, receiving said one of said resilient clamp portions, and having two circumferentially spaced-apart groove walls, said one of said resilient clamp portions having two circumferentially opposite ends abutting respectively against said groove walls.

3. The handgrip of claim 2, wherein said sleeve ring further has a second retaining groove formed in said inner face opposite to said first retaining groove and receiving the other one of said resilient clamp portions.

4. The handgrip of claim 1, wherein said sleeve ring further has two circumferentially spaced-apart recesses formed in said outer face thereof and communicating spatially and respectively with said slots, said nut members being disposed respectively in said recesses.

5. The handgrip of claim 1, wherein each of said nut members has one end provided with an internally threaded hole, and the other end provided with a tool-receiving groove.

6. The handgrip of claim 1, wherein said annular first end has an annular flange projecting outwardly and radially from said annular first end, and said sleeve ring abuts against said annular flange when sleeved around said resilient clamp portions.

7. The handgrip of claim 1, wherein said tubular grip body includes an outer tube having said annular first end, and an inner tube fitted within said outer tube and having said resilient clamp portions.

8. The handgrip of claim 1, wherein said tubular grip body further has an annular second end opposite to said annular first end, said handgrip further comprising a second fastening unit having a structure similar to said first fastening unit and disposed on said annular second end.

* * * * *